United States Patent [19]

Kinderling et al.

[11] 4,086,805
[45] May 2, 1978

[54] APPARATUS FOR EVALUATING MEASUREMENT SIGNALS

[75] Inventors: Eckart Kinderling, Tecklenburg; Herwig Erauw, Osnabruck; Alfons Rudolf, Ibbenburen; Helmut Klintworth, Tecklenburg, all of Germany

[73] Assignee: Keller Spezialtechnik-Pyro Werk GmbH, Ibbenburen-Laggenbeck, Germany

[21] Appl. No.: 675,854

[22] Filed: Apr. 12, 1976

[30] Foreign Application Priority Data

Apr. 15, 1975 Germany .............................. 2516344

[51] Int. Cl.$^2$ ........................ G01K 7/14; G01R 19/16
[52] U.S. Cl. ............................. 73/359 R; 73/432 CR; 324/102
[58] Field of Search .................... 73/359, 432 CR; 307/235 A; 324/102; 328/148

[56] References Cited

U.S. PATENT DOCUMENTS

| | | | |
|---|---|---|---|
| 2,282,726 | 5/1942 | Jones | 73/359 X |
| 3,528,800 | 9/1970 | Blum et al. | 73/23 X |
| 3,631,263 | 12/1971 | Graham et al. | 307/235 A X |
| 3,677,064 | 7/1972 | Simpson | 73/17 R |
| 3,714,465 | 1/1973 | Skrenes | 328/148 X |
| 3,872,726 | 3/1975 | Kauffeld et al. | 73/362 AR |
| 3,875,516 | 4/1975 | Thomas | 307/235 A X |

Primary Examiner—Richard C. Queisser
Assistant Examiner—John S. Appleman
Attorney, Agent, or Firm—Benoit Law Corporation

[57] ABSTRACT

Apparatus for evaluating a measurement signal having an initial transient issuing into a more stationary value include equipment for monitoring the rate of change of the measurement signal. This monitoring equipment issues a control signal when that rate of change falls below a predetermined value. An analysis of the measurement signal is initiated in response to the latter control signal.

Apparatus for evaluating at least two measurement signals generated by two transducer probes and having mutually overlapping initial transients issuing into more stationary values at different times include equipment for determining the time sequence wherein the measurement signals issue into the more stationary values. The measurement signals are sequentially applied to evaluating equipment in accordance with that determined time sequence.

28 Claims, 15 Drawing Figures

APPARATUS FOR EVALUATING MEASUREMENT SIGNALS

BACKGROUND OF THE INVENTION

1. Field of the Invention

The subject invention relates to the evaluation of measurement signals and, more specifically, to apparatus for analyzing measurement signals having transients and discontinuities. An exemplary field of utility of the invention resides in the measurement of parameters of steel and other metallic melts with immersion probes.

2. Description of the Prior Art

Known apparatus for evaluating measurement signals affected by transients have the disadvantage of requiring the participation, and relying on the performance, of a human operator who determined a cessation of the transient in order to initiate the evaluation process, and who thereupon monitors the time function of the course of the measurement signals with the aid of line recorders and similar instruments, so as to select suitable points of time for the evaluation and to avoid as far as possible those errors which stem from a deviation of the signal time function from a characteristic value and from other discontinuities.

SUMMARY OF THE INVENTION

It is a board object of the invention to overcome the above mentioned disadvantages.

It is a germane object of the invention to provide improved apparatus for analyzing or evaluating measurement signals.

It is a related object of the invention to provide improved apparatus for analyzing or evaluating measurement signals having signal transients and other discontinuities.

It is a further object of the invention to provide improved measurement equipment for the steel and metal melting and processing industries.

From a first aspect thereof, the subject invention resides in apparatus for analyzing a measurement signal of a transducer probe having an initial transient issuing into a more stationary value. The invention according to this aspect resides, more specifically, in the improvement comprising in combination, means for monitoring the rate of change of the measurement signal for generating a control signal when the rate of change falls below a predetermined value, means connected to the monitoring means for initiating an analysis of the measurement signal in response to the control signal, means for determining when the measurement signal has reached a predetermined minimum value, means connected to the determining means for disabling the monitoring of the rate of change until said determination has been effected, and means connected to the initiating means for analyzing the measurement signal, including means for storing in response to the control signal only the more stationary value of the measurement signal.

From a second aspect thereof, the subject invention resides in apparatus for analyzing at least two measurement signals generated by two transducer probes and having mutually overlapping initial transients issuing into more stationary values at different times. The invention according to this aspect resides, more specifically, in the improvement comprising, in combination, means for determining the time sequence wherein the measurement signals issue into the more stationary values, means for analyzing each of the measurement signals, and means connected to the determining means and the analyzing means for sequentially applying the measurement signals to the analyzing means in response to the determined time sequence.

In the case of an evaluation of two or more measurement signals, preferred embodiments of the subject invention permit components, such as preamplifiers, analog-to-digital converters, oscillographs and line recorders and other equipment needed for signal processing purposes to be utilized sequentially for two or more signals. This greatly economizes on procurement expenses, space requirements and weight of the equipment. The resulting reduction of components also reduces down-time of the overall installation and expands their field of utility to areas in which space, cost and similar requirements have so far excluded use of equipment of the subject type.

Preferred embodiments of the subject invention also provide for improved readouts which concentrate on the phases of operation which are of particular interest and relevancy.

In accordance with a preferred embodiment of the invention, the apparatus includes means for sensing discontinuities in a measurement signal, for storing a received measurement signal, and for subjecting the stored measurement signal to the above mentioned monitoring function in response to a sensed discontinuity.

BRIEF DESCRIPTION OF THE DRAWINGS

Further embodiments and advantages of the invention are apparent from the claims as well as from the following description with reference to the accompanying drawings, wherein:

DESCRIPTION OF PREFERRED EMBODIMENTS

Figure 1:
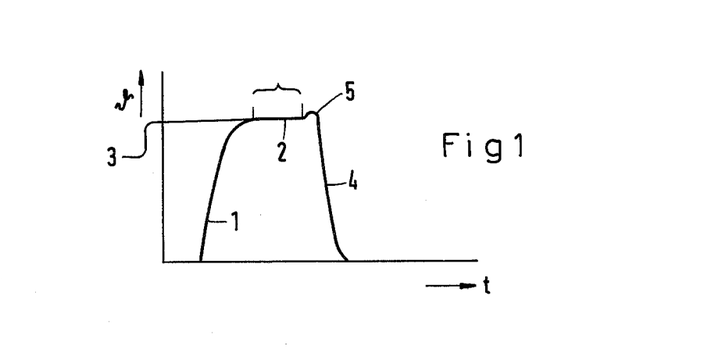
FIG. 1 is a graph of the time (t) versus temperature ($\theta$) function of the output voltage of a thermocouple element of a measuring probe immersed in a steel melt.

The time (t) versus temperature function of the measuring signal shown in FIG. 1 comprises an initial transient 1, corresponding approximately to that of a first-order time-delay element, a region 2 wherein the signal has an at least approximately stationary value 3, and a region 4 wherein the measuring signal returns to zero upon termination of the measurement. This time function of the measurement signal results from a particular operating sequence wherein at a time of $t = 0$ a lance having its head equipped with a measuring probe is immersed in a steel melt and a thermocouple contained in the probe generates a measurement signal as a function of temperature but delayed by the thermal capacity and the insulating enclosure of the probe. The temperature of the melt is to be read in the region 2, which only can start to exist when the initial transient has sufficiently terminated, and which is further limited by the fact that the temperatures prevailing in the steel melt at first attack the probe enclosure and then the probe itself. The point of time controlling for analytical purposes is, therefore, relegated to the region 2, which may be further affected by a "slag-nose" 5; a protuberance caused by the transition of the probe through the slag layer on the melt.

Figure 2:
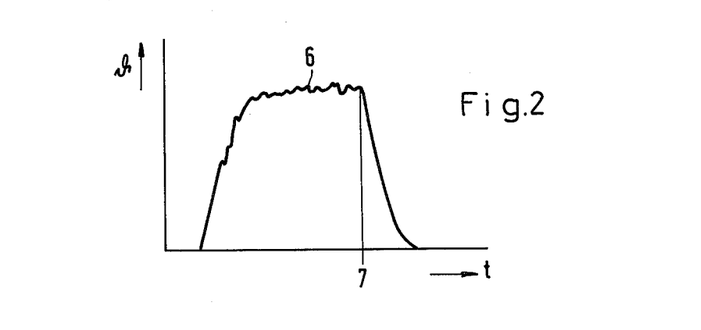
FIG. 2 is a graph of a time function, corresponding to that shown in FIG. 1, of a signal affected by disturbances or discontinuities.

FIG. 2 illustrates a time function of a measuring signal which, relative to that shown in FIG. 1, is strongly affected by disturbances or discontinuities. To be sure, the cause therefor may be be defective measuring equipment. However, more frequent are the measuring signal fluctuations which are caused by particularly unsteady melts occurring, for instance, during boiling or at excessive oxygen contents. The measuring signal then issues into an intensely fluctuating course 6, from which the measurement value can only be derived through arbitrary or random probing, averaging or similar procedures. Since it is not then possible to achieve a steady signal by the passage of time, no definitive region is discernible. While with an undisturbed time function, the initial signal transient into the steady signal condition is essentially terminated after about 3.5 seconds, for instance, the measurement cycle has to be arbitrarily limited when the signal proceeds according to FIG. 2. In this case, the measurement is terminated at 7 as a so-called "urgency time measurement" after, for instance, 6 seconds, so as not to endanger the immersion lance and the measuring probe.

Figure 3:
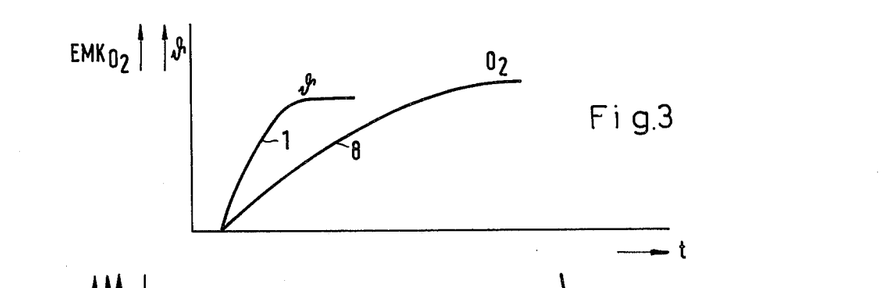
FIG. 3 is a graph of time functions of measurement signals for the temperature ($\theta$) and for the free oxygen content ($O_2$) in a steel melt, picked up by a probe immersed in the melt.

FIG. 3 shows the two initial transients of two measurement signals as a function of temperature as already shown in FIG. 1, and as a function of free oxygen content ($O_2$) measured in a steel melt. The initial transient discernibly terminates in the stationary region much sooner for the signal indicating temperature, than for the signal indicating oxygen content, the initial transient 8 of which extends, for instance, over 15 seconds.

Figure 4:
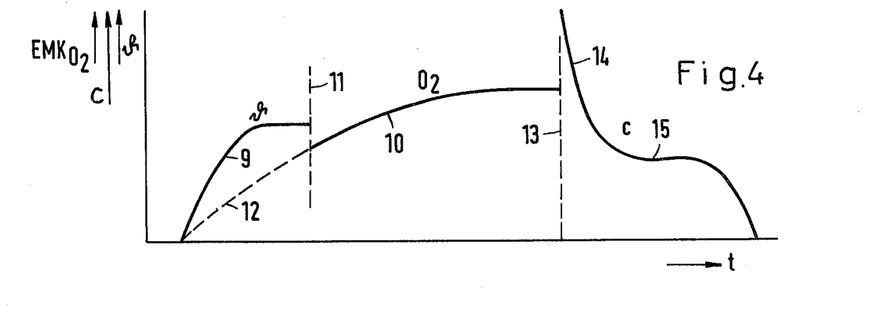
FIG. 4 is a graph of time functions of signals for the measurement of temperature ($\theta$), oxygen content [$O_2$] and carbon content (C) of a steel melt.

FIG. 4 illustrates the handling according to the invention of such measuring signals eventuating at different points of time in stationary values as those shown in FIG. 3. An analytical apparatus first is fed the temperature-dependent signal 9 which achieves its stationary value relatively rapidly. The analytical apparatus detemines on the basis of the derivative or differential quotient of the measuring signal that the stationary value has been reached with sufficient accuracy, measures the stationary value and switches then to the next-following signal. In lieu of the differential quotient of the measuring signal, the differential quotient of a previously smoothed or filtered measuring signal or differences of samples of the signal may be employed to determine when the stationary value has been reached.

The signal next in line to achieve a stationary value is the measurement signal 10 indicating the free oxygen content in the steel melt. After a switchover indicated by the dotted line 11, the measurement signal 10 for the oxygen content is exclusively handled in the analytical equipment; being then subjected to the same previously described surveillance as to whether the signal has reached its stationary value. That an initial phase 12 of the measurement signal 10 is switch off during the preceding measurement of the signal 9, does not affect the determination of the incidence of the stationary value. After the measurement signal 10 has reached its stationary value, that value can be determined, whereupon once again a switchover, indicated by the dotted line 13, can be effected.

The further measurement signal 14 shown in FIG. 4 depicts the cooling down time function of a probe or sample which may be derived from the melt by a test crucible or pot affixed to the immersion lance. This measurement signal passes in a median region at the so-called "liquidus point" into a temporarily stationary region 15 which, quite similarly to the above mentioned stationary values, may be discerned, whereby its magnitude indicates the carbon content in the melt. The illustrated curve 14 is not to be taken as being drawn to scale; its drawn-out time function has been shown foreshortened for reasons of illustration.

With the measurement signals 9 and 10 shown in FIG. 4, the changeover to the next signal takes place when the initial transient has stabilized and the signal is essentially maintaining a stationary value. Prior to the changeover, the stationary value has to be determined and the point of time for the measurement is generally selected to fall immediately ahead of the switchover point of time.

Figure 5:
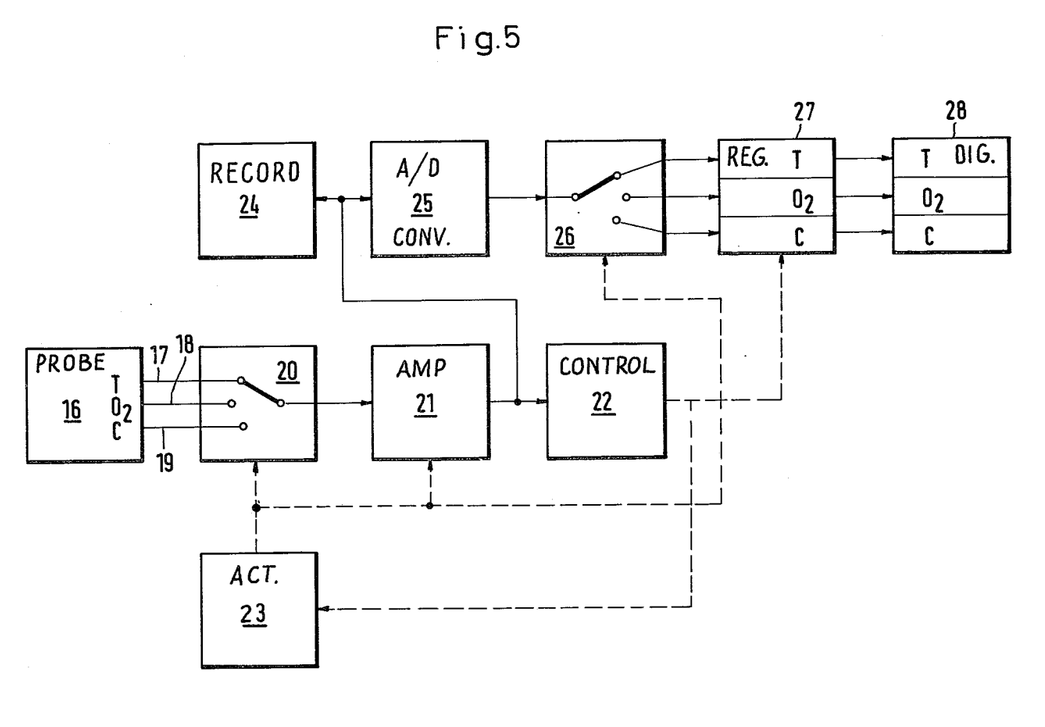
FIG. 5 is a block diagram of a measurement analysis apparatus in accordance with a first preferred embodiment of the subject invention.

The block diagram according to FIG. 5 of an analyzing apparatus according to a preferred embodiment of the subject invention provides for a probe assembly 16 which, via separate lines 17, 18 and 19, transmits measurement signals indicating the temperature, the oxygen content ($O_2$), and the carbon content (C), such as in the form of the signals 9, 12–10 and 14 in FIG. 4, to the input terminals of the changeover switch 20. The signal selected by the changeover switch 20 is passed on to an amplifier with variable amplification factor and thence to an interponent actuator or control device 22 which, for instance, determines a sufficient approximation of a stationary value with the aid of a differentiating device. The control 22 may, moreover, include a timing or delay element which releases a switchover to a so-called "emergency time measurement" when the differentiating device up to a predetermined maximum elapsed time remains unable to determine a sufficient approximation to a stationary value. The control 22 issues its signal storage and changeover initiation commands to a changeover switching actuator 23 which, in turn, adjusts the amplification factor of the amplifier 21 and, as needed, further parts of the analyzing apparatus.

The output signal of the amplifier 21 is, on the one hand, applied to a curve-drawing or line recording instrument 24 and, on the other hand, to an analog-to-digital converter 25. The instrument 24 records the time functions of the measurement signals such as, for instance, in the manner shown in FIG. 4. The adjustment of the amplification factor under the control of the changeover actuator 23 enables an outstanding utilization of the range of operation of the recorder 24. At the same time, the range of operation of the analog-to-digital converter can be fully utilized, with the advantage of a sufficient resolution. The signal issued by the analogto-digital converter 25 passes through a further changeover switch 26 to the respective storage areas of a digital register 27. The changeover switches 20 and 26 are shown in FIG. 5 as contact-type switches for the purpose of illustration, but may advantageously be provided as contact-less switches. For instance, the switch 20 may be formed as an electronic switch and the switch 26 as a preprogrammed address control of a computer and the like.

In general, only the stationary values of the measurement signals are stored in digital form. The points of time relevant to this purpose are advantageously also determined by the control 22 which monitors the transition of a stationary value. A decision whether the measuring signals are sensed on the input side or on the output side of the analog-to-digital converter 27; that is, whether a current or analog signal, or then only a certain sensed value, is converted, may be made dependent on the selected type of the conversion procedure. For instance, a sensing on the output side is advantageous, if the converter continuously follows variations of the input signal. On the other hand, an analog-to-digital converter which periodically converts the input signal anew is advantageously set for conversion exactly at the sensing point of time.

The values stored in different storage areas of the digital register 27 may, for instance, for analyzed by a digital computer and mutually combined, taking into account the values adjusted by the changeover actuator at the amplifier 21. At the same time, the stored values may be indicated by a digital readout instrument 28. Such a digital indication may be provided in each instance up to the initiation of the next measuring cycle.

Accordingly, the described analyzing equipment is capable of processing and indicating measured values which are issued by a probe 16 on a suitable immersion lance or dip stick, such as from within a steel melt, and which are eventually stored and processed in a computer. On the basis of the range controlled additional recordation of the measurement signals by the recorder 24, there may be effected a determination as to whether the measurement signals are taking a normal, undisturbed or then a disturbed and discontinuous course. In this manner, the recorded train of curves displays the interesting sections of the measurement signal. A particularly economic advantage results from the fact that, with the aid of the single-channel-type of processing of the input signal after a changeover switching operation, the recorder 24, the analog-to-digital converter 25, the amplifier 21 and the control 22 are utilized in a multiple manner; that is, successively for all three of the signals shown in FIG. 4.

Particular requirements and difficulties to be taken into account in the analysis of discontinuous measurement signals derived from a metallic melt by a signal pick-up and affected by an initial transient are illustrated in FIGS. 6 to 12.

Figure 6:
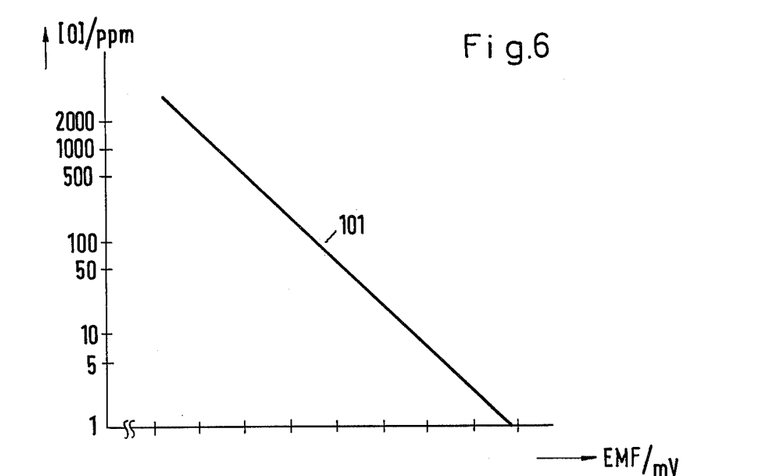
FIG. 6 is the static characteristic curve of a signal pick-up for the oxygen content of a metallic melt.

FIG. 6 shows the characteristic curve 101 of a pick-up for measuring the oxygen content of a metallic melt which, in a logarithmic correlation between the oxygen content [O], indicated in ppm, and the generated measurement signal voltage EMF, indicated in millivolts, mV, is able to cover a range of several decades. This logarithmic relationship brings about a relatively high sensitivity at low values of oxygen content. If in the analysis of generated EMF one were to lay down a tolerance value which is independent on the range of operation and which takes into account the accuracy requirements at high oxygen contents, then such tolerance value would correspond to extremely small absolute ranges of the oxygen content at low oxygen values; which ranges would already be exceeded by the measurement signal at modest inhomogeneities of the melt (cf. FIGS. 7 and 8).

Figure 7:
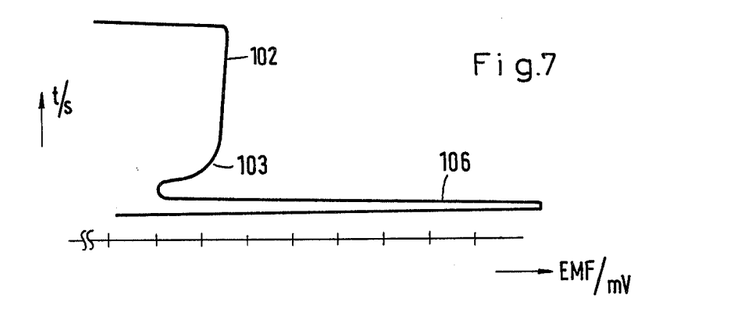
FIGS. 7 to 12 are graphs of various initial transients of output signals of a pick-up for the oxygen content of a metallic melt at the immersion into the melt, as influenced by the oxygen content of the melt and by various disturbances of the signal or defects of the pick-up.
Figure 8:
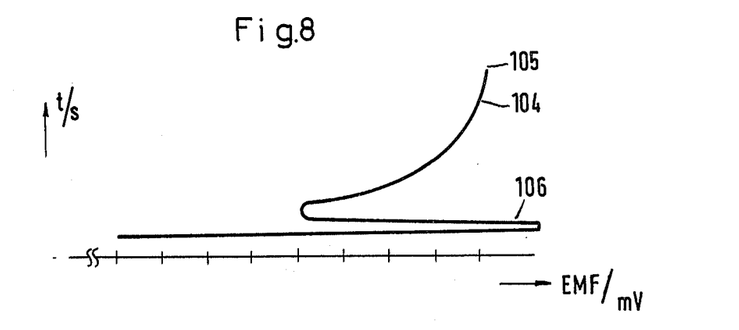

FIGS. 7 and 8 show typical time functions (t in seconds) of measurement signals 102 and 104 at the time of immersion into a metallic melt of a signal pick-up having the characteristic 101 according to FIG. 6. At high oxygen contents (FIG. 7) there occurs not only a smaller stationary value of the EMK, but also a shorter duration of the initial transient 103, than with measurements at smaller oxygen contents (FIG. 8). According to practical requirements, a larger absolute tolerance and therefore a greater variation of the measurement signal at the moment of evaluation 105 is acceptable for a small oxygen content in the analysis of the signal 104 in FIG. 8, and the result of the measurement then still possesses a satisfactory accuracy.

The initial transients according to FIGS. 7 and 8 further display a typical overshoot 106 caused by various thermal and electrochemical recovery processes at the immersion of the pick-up in the metal melt. If desired or necessary, the overshoot or swing 106 may be employed as trigger signal for a measurement and as test signal for monitoring the proper operation of the measuring element.

Figure 9:
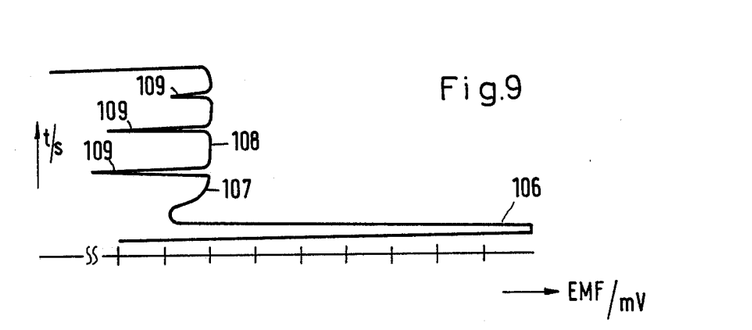

FIG. 9 depicts a measurement signal 107 which basically is akin to those of FIGS. 7 and 8, passing into a stationary value 108, but being distorted by needle-shaped spurious pulses 109 caused, for example, by electromagnetic stray fields.

Figure 10:
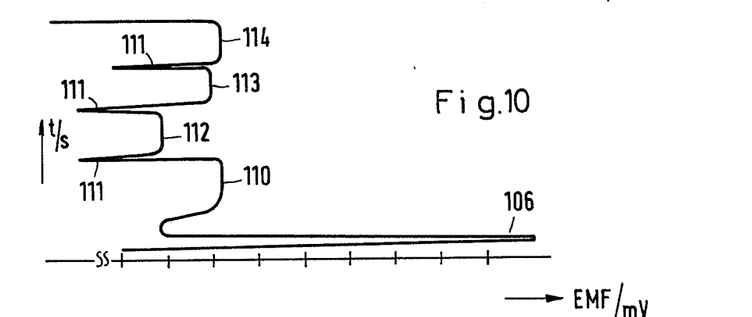

FIG. 10 shows a measurement signal 110 which, like the signal in FIG. 9, includes spurious pulses 111 but maintains no constant value in the interim. Rather the signal 110 varies between different values 112, 113 and 114, such as because of a defect in the measuring element or in the successive signal path. Such a measuring signal is symptomatic of a defect and must not be made the basis of analysis.

Figure 11:
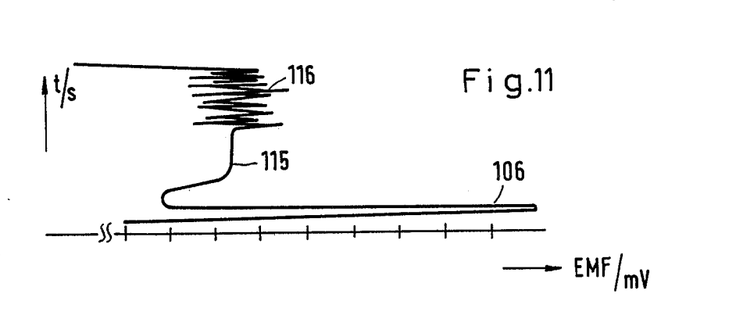

A further measurement signal 115 shown in FIG. 11 is affected by a superimposed alternating current 116 in its constant value region. Presupposing sufficient smoothing or filtering, such a signal is analyzable.

Figure 12:
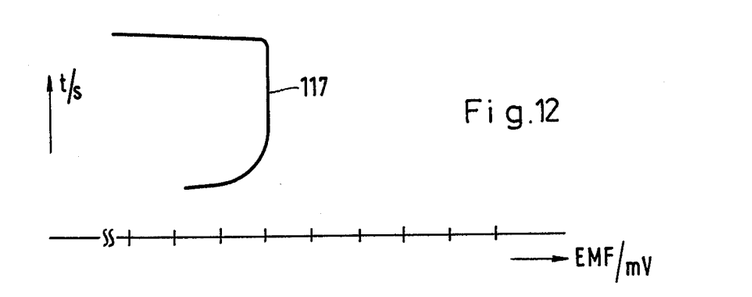

A further typically faulty signal time function 117 according to FIG. 12 reaches its stationary value without the characteristic overshoot 106 (see FIGS. 7 to 11). This deviation can easily be monitored and utilized for a setting aside of the faulty measurement.

Figure 13:
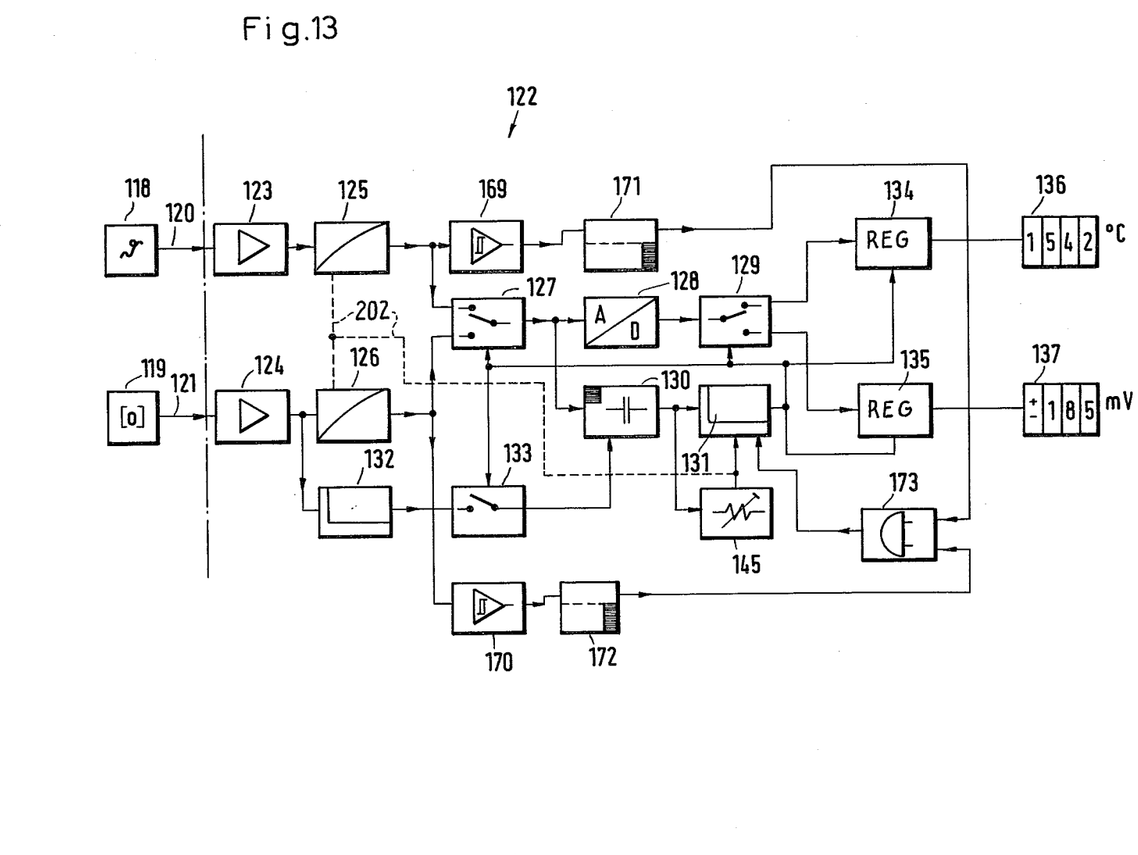
FIG. 13 is a block diagram of a measurement analysis apparatus in accordance with a further preferred embodiment of the invention.

FIG. 13 is a block diagram for the analysis of two discontinuous signals derived from a metallic melt by means of two pick-ups. In particular, a pick-up 118 for the temperature and a pick-up 119 for measuring the oxygen content in the metallic melt are, for example, unified to a probe assembly in an immersion lance or dip stick and are connected via lines 120 and 121, respectively, to an apparatus, commonly designated as 122, for analyzing the measurement signals.

In the apparatus 122, an amplifier 123 and a time delay element 125 are connected to the output line 120 of the pick-up 118, while an amplifier 124 and a time delay element 126 are connected to the output line 121 of the pick-up 119. Th output signals of the delay elements 125 and 126 are supplied to a double-throw switch 127 which, according to its position at the time, feeds one or the other of these output signals to an analog-to-digital converter 128 with output switch 129 on the one hand, and to a holding element 130 and actuating or control element 131 combination on the other hand.

The signal issuing from the pick-up 119 for the oxygen content of the melt is tapped between the amplifier 124 and delay element 126 and is fed to a control element 132, the output signal of which reaches the holding element 130 via a switch 133 which is ganged to, and simultaneoulsy actuated with, the double-throw switch 127 to release the holding function.

An analysis of the signals generated by the pick-ups 118 and 119 at their immersion in a metallic melt is possible with the above mentioned components of the apparatus 122 in such a manner that first the signal of the temperature measurement and then, after actuation of the switches 127 and 132, the signal of the oxygen content measurement is analyzed. The largely disturbance-insensitive signal for the temperature measurement, which reaches rapidly its stationary value, reaches via the amplifier 123, delay element 125 and double-throw switch 127 the analog-to-digital converter 128 and, via the holding element 130, also the control element 131. The open switch 133 excludes at this time the transfer of commands from the control element 132 to the holding element 130. The holding element 130 at this juncture operates in the manner of a practically undelayed transformer. The control element 131 detects the time variations of the measurement signal and determines by comparison with preset threshold values whether a sufficiently stationary value has been reached. If so, the control element 131 issues control commands or signals in response to which the measurement signal is suitably analyzed and the switches 127, 129 and 133 are actuated.

Through actuation of the switches 127 and 133 a signal path from the pick-up 119 for the oxygen content of the melt is connected through to the control element 131 (and to the analog-to-digital converter 128), and a connection from the control element 132 to the holding element 130 is established. If the course of the signal is free of disturbance, the part of the apparatus 122 under consideration operates in the manner corresponding to that of the analysis of the signal for the temperature measurement. However, sudden changes in the signal course are detected by the control element 132 which responds to signals exceeding predetermined variables.

In the latter case, the output signal of the control element 132 releases the holding function of the holding element 130 as more fully described below. The measuring signal preceding the disturbance is retained in the holding element for the duration of the disturbance so that the control element 131 will receive a smoothened signal free of temporary or short-term disturbances. Needle-shaped pulses 190, such as shown in FIG. 9, do not reach the control element 131 and do not prevent same to issue a control signal. Likewise, the control element 131 is capable of responding in the case of a superimposed alternating current 116 according to FIG. 11. However, in the case of a signal which varies in its basic course according to FIG. 10, the holding element 130 terminates its holding function after the decay of the needle-shaped pulses 111 and feeds the control element 131 a step function input signal, whereupon that control element does not issue a control signal for lack of a stationary measurement signal.

In the illustrated embodiment of the invention, the signal paths of the pick-ups are led together via the double-throw switch to the analog-to-digital converter 128 and, thereafter, are fanned out to be stored in digital form in the digital registers 134 and 135, respectively, if necessary after a code transformation, and to be rendered visible through digital readout instruments 136 and 137. In lieu of the analog-to-digital converter 128, there may, of course, be employed after the double-throw switch 127 other analyzing or evaluation equipment which, at least partially, are commonly employed for both signals. By the same token, there may be provided separate evaluation or utilization equipment for each measuring value or signal, either in addition to, or then in lieu of the analog-to-digital converter 128, so that only the holding element 130 and the control element 131 receive the signal selected by the switch 127.

If necessary, a control element corresponding to the control element 132 may also be associated with the signal path for the temperature measurement, in order to keep spurious signals from the control element 131. On the other hand, if the apparatus is only designed for the analysis of a single measurement signal, such as for the signal indicating the oxygen content, then the switch 127, as well as the switch 133, may be dispensed with and replaced by continuous connections.

In the illustrated embodiment the delay element 126, shown as a first-order delay element, has a dual function; namely, the smoothening of the signal against high-frequency disturbances and the provision of a delay in order to enable a correctly timed release of the holding element 130. To the extent that a prolonged delay is necessary or a reduction of the low-pass effect relative to the delay is to be realized, a delay line or a higher-order delay element may be employed.

In the instant case, there is employed an analog-to-digital converter 128 which on the basis of its method of operation brings about an intensive smoothening of the signal and which is hardly susceptible to the disturbances illustrated in FIGS. 9 and 11. On the other hand, a suitable smoothening or filtering element may be connected ahead of, or the output signal of the holding element 130 may be employed as the input signal of, the analog-to-digital converter.

Figure 14:
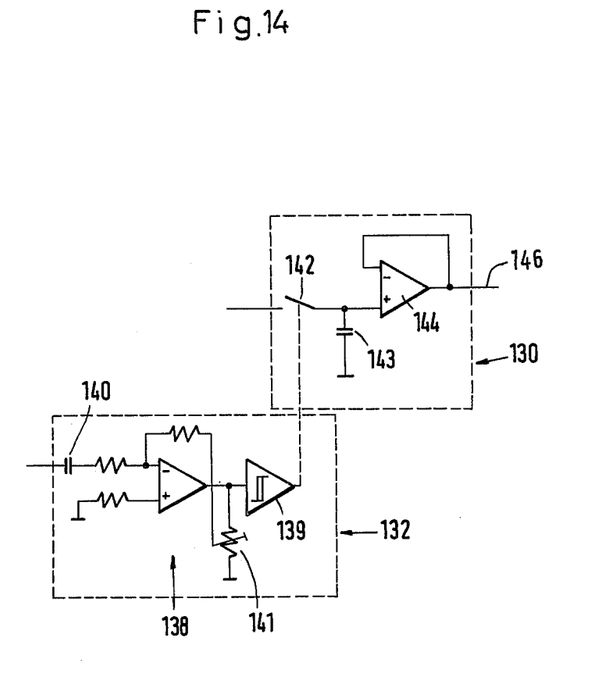
FIGS. 14 and 15 are circuit diagrams of two parts of combined blocks employed in the apparatus of FIG. 13.

FIG. 14 shows the composition of the control element 132 and the holding element 130, as well as the interconnection of the two, in accordance with a preferred embodiment. The control element 132 comprises a differentiating circuit 138 and a treshold triggering device 139 connected thereto. The differentiating circuit is composed of a direct-current amplifier having an input coupling capacitor 140 and being adjustable at the output via a voltage divider 141. When the signal exceeds a predetermined variation rate, the threshold triggering device 139 issues a signal to the holding element 130.

The holding element 130 includes at its input a cutoff switch 142 which preferably is electronic, through represented in the drawing by a break contact symbol, being closed in its rest position. The input signal of the circuit 130 passes via the normally closed break contact 142 to one side of a storage capacitor, the other side of which is connected to a reference potential. The voltage at the storage capacitor 143 is passed on to the control element 131 (see FIG. 13) via a direct-current amplifier 144, connected as an impedance transformer. As long as the switch 142 is closed, the output signal of the impedance transformer 144 follows the input signal practically without delay. If the break switch 142 is open, the voltage value stored by the capacitor 143 prior to the opening of the switch 142 is passed on to the control element 131.

Figure 15:
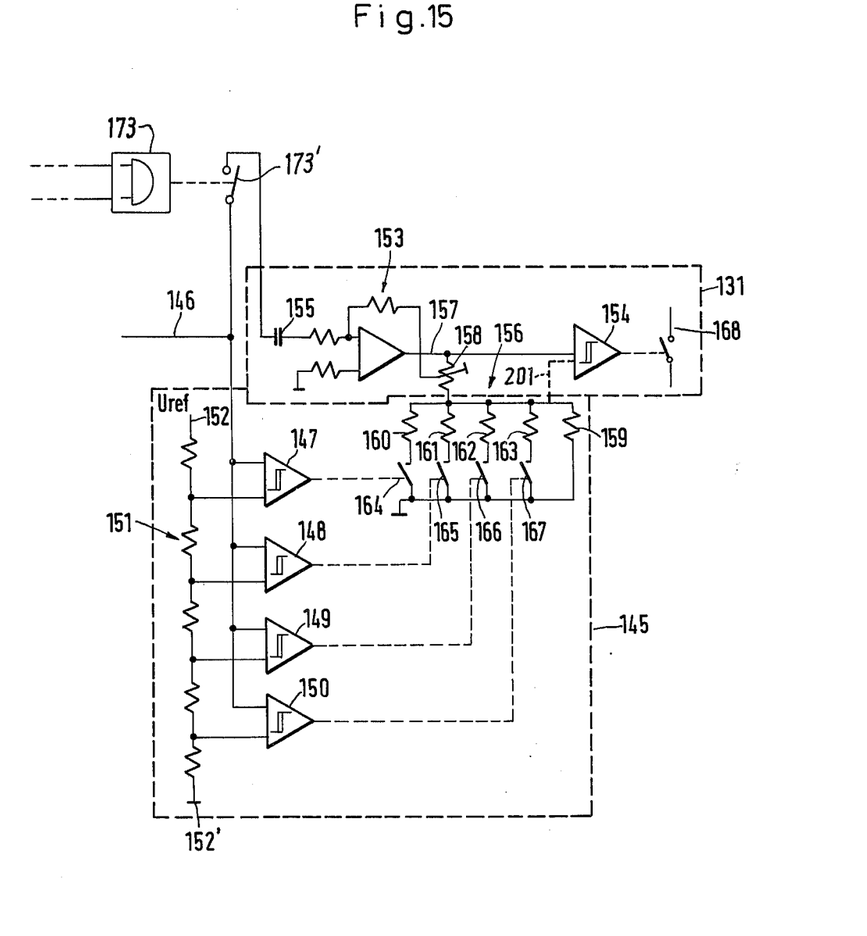

The block diagram of FIG. 13 includes a range selector 145 associated with the control element 131. A preferred composition and interconnection of both of these elements is seen in FIG. 15.

The control element 131 and the range selector 145 receive via a common line 146 the same input signal; namely, the output signal of the holding element 130. This input signal is compared in the range selector 145 by four threshold triggering devices 147, 148, 149 and 150 having different predetermined threshold levels. These threshold levels are tapped from a voltage divider 151 which, on the one hand, is connected to a reference potential at 152' and, on the other hand, is supplied with a reference voltage Uref.

The control element 131 comprises a differentiating circuit 153 and a threshold triggering device 154. The differentiating circuit is in the form of a direct-current amplifier with input coupling capacitor 155.

The voltage for the feedback path of the direct-current amplifier is derived from a resistance lattice or network 156 between the output 157 of the amplifier and the reference potential. The resistance network includes an ajudstable resistor 158 having a voltage tap for the feedback path, and a resistor 159 in series with the resistor 158 relative to the reference potential. Further resistors 160, 161, 162 and 163 are selectively switchable in parallel to the resistor 159 via switches 164, 165, 166 and 167. Each of these switches has a threshold triggering device 147, 148, 149 and 150, respectively, associated therewith for actuation purposes. The number of triggered or released threshold triggering devices varies according to the voltage of the measurement signal arriving via line 146, which in turn varies the feedback of the differentiating circuit 153 and thus its sensitivity.

When the output signal of the differentiating circuit 153, which is variable in a step function with the aid of the threshold triggering devices 147, 148, 149 and 150, falls below the preset threshold value of the triggering device 154, then that device 154, via switching elements symbolically illustrated by a switch 168, releases the components for the analysis or evaluation of the particular measurement signal and the actuation of the switches 127, 129 and 133 (see FIG. 13).

Instead of varying the input-output ratios of the differentiating circuit 153, one may alternatively adjust the threshold level of the triggering device 154. Also, if necessary, there may be provided an amplitude or operation level dependent adjustment or control of the delay elements 125 and/or 126 or of other parts of the apparatus 122, with the aid of the threshold triggering devices 147, 148, 149 and 150. A dotted line 201 in FIG. 15 indicates the alternative adjustment of the threshold level of the triggering device, while dotted lines 202 of FIG. 13 indicate the amplitude or operation level dependent adjustment or control of the delay elements 125 and/or 126, mentioned in this paragraph.

The apparatus 122 according to FIG. 13 further includes for the analysis of each of the two signals a threshold triggering device 169 and 170, respectively, having bistable trigger or multivibrator elements 171 and 172 connected thereto. The threshold triggering devices 169 and 170 receive, respectively, the output signals of the delay elements 125 and 126 and the triggering devices 171 and 172 issue a signal to the control element 131 (or close a switch 173', FIG. 15) via an AND-element 173.

The latter components perform the function of assuring that the apparatus 122 permits an analysis or evaluation of measurement signals only when the measurement values have exceeded a predetermined minimum value.

If the pick-up 119 is functioning properly, its output signal will include the typical overshoot or swing 106 shown in FIGS. 7 to 11 and discussed above in connection therewith. To test this function, the threshold triggering device 170 detects the corresponding high swing and issues an output signal which is stored in the bistable trigger stage 172. In addition, the output signal of the pick-up 118 may be subjected to a minimum value, such as the measurement value corresponding to a temperature of 1000° C. The triggering device 169, when adjusted in its threshold level to the latter value, sets the bistable trigger stage 171 when that value has been reached. Accordingly, if both measurement signals have exceeded the required signal value or amplitude, then there results a clearance or release signal for the control element from the AND combination, at the gate element 173, of the output signals of the triggered stages 171 and 172, whereby the controlled measurement signal analysis or evaluation may take place.

On the other hand, if one or both measurement values fail to reach the required minimum value, then the clearance or release command by the AND-gate 173 remains outstanding and the analysis of the faulty measurement is omitted.

The threshold triggering device 169 or 170, or the bistable trigger stages 171 and 172, respectively, may be replaced by a measurement element or circuit component with dynamic input characteristics so that the requirement of a lower limit may be established and tested for the rise time or rate of a measurement signal. Moreover, the amplitude of the overshoot or swing 106 (FIGS. 7 to 11) may be stored in an analog register or storage device, to be compared with the stationary value of the measurement signal at the point of time of analysis or evaluation. In this manner, a decision about the utility of the signal may be made on the basis of the ratio of the latter values.

By way of recapitulation, the control element 131, complemented by the holding element 130 and the control device 132, enables a detection of the transition of a discontinuously picked-up measurement signal into its stationary value for the purpose of analysis and evaluation, even when needle-shaped or high-frequency disturbances are superimposed on the measurement signal. In the course of the analysis, the switching of the control element 131 and of other, preferably uniquely provided circuit components, onto different measurement signals (see FIG. 4), which successively assume stationary values, may be effected.

As a particular advantage of a preferred embodiment of the subject invention, the sensitivity of the control element 131 as mentioned above is adjusted as a function of the signal magnitude, such as by means of the range selector 145. In addition, there may be provided circuit components which monitor the absolute magnitude of the measurement signal, such as by detecting their surpassing of predetermined minimum values.

Further modifications and variations within the spirit and scope of the invention will be suggested by, or become apparent from, the subject extensive disclosure to those skilled in the art.

We claim:

1. In apparatus for analyzing a measurement signal of a transducer probe having an initial transient issuing into a more stationary value, the improvement comprising in combination:
   means for monitoring the rate of change of said measurement signal for generating a control signal when said rate of change falls below a predetermined value;
   means connected to said monitoring means for initiating an analysis of said measurement signal in response to said control signal;
   means for determining when said measurement signal has reached a predetermined minimum value;
   means connected to said determining means and said monitoring means for disabling said monitoring of said rate of change until said determination has been effected; and
   means connected to said initiating means for analyzing said measurement signal, including means for storing in response to said control signal only said more stationary value of the measurement signal.

2. Apparatus as claimed in claim 1, wherein:
   said monitoring means include means for differentiating said measurement signal to provide a derivative signal, for comparing the value of said derivative signal to a threshold value and for generating said control signal when said value of the derivative signal has fallen below said threshold value.

3. Apparatus as claimed in claim 1, including:
   means connected to said monitoring means for adjusting the sensitivity of said monitoring means as a function of said measurement signal.

4. Apparatus as claimed in claim 3, wherein:
   said adjusting means comprise means for adjusting the sensitivity of said monitoring means in steps.

5. Apparatus as claimed in claim 1, including:
   means connected to said monitoring means for varying the range of operation of said monitoring means inversely relative to said measurement signal.

6. Apparatus as claimed in claim 1, wherein:
   said determining means include means for receiving said measurement signal and for issuing an output signal when the value of said received signal has exceeded a predetermined threshold value, and bistable means connected to the latter means for issuing a clearance signal in response to said output signal.

7. Apparatus as claimed in claim 1, wherein:
   said determining means include means for determining the rise time of said measurement signal and for disabling said monitoring of said rate of change until said rise time has reached a predetermined lower limit.

8. Apparatus as claimed in claim 1, wherein:
   said determining means include means for effecting a comparison of an amplitude excursion of said initial transient with a stationary value of said measurement and means for selectively enabling said monitoring means in response to said comparison.

9. In apparatus for analyzing a measurement signal of a transducer probe having an initial transient issuing into a more stationary value, the improvement comprising in combination:
   means for receiving said measurement signal from said probe;
   means for monitoring the rate of change of said measurement signal for generating a control signal when said rate of change falls below a predetermined value;
   selectively actuable means connected between said receiving means and said monitoring means for applying said received signal to said monitoring means;
   means connected to said receiving and said applying means for sensing a discontinuity in said received signal and for interrupting said application of said received signal to said monitoring means in response to a sensing of said discontinuity;
   first storing means for storing said received measurement signal and means for applying said stored measurement signal to said monitoring means upon said interruption of said received signal;
   means connected to said monitoring means for initiating an analysis of said measurement signal in response to said control signal; and
   means connected to said initiating means for analyzing said measurement signal, including second storing means for storing in response to said control signal and in said analyzing means only said more stationary value of the measurement signal.

10. Apparatus as claimed in claim 9, wherein:
    said monitoring means include means for differentiating said applied signal to provide a derivative signal, for comparing the value of said derivative signal to a threshold value and for generating said control signal when said value of the derivative signal has fallen below said threshold value.

11. Apparatus as claimed in claim 9, wherein:
    said applying means include switching means between said receiving means and monitoring means;
    said sensing and interrupting means include means for selectively opening said switching means; and
    said first storing means include an analog storing element connected to said applying means between said switching means and said monitoring means.

12. Apparatus as claimed in claim 9, including:
    means between said receiving means and said monitoring means for delaying said received signal.

13. In apparatus for analyzing a measurement signal of a transducer probe having an initial transient issuing into a more stationary value and having an overshoot in said initial transient, the improvement comprising in combination:
    means for monitoring the rate of change of said measurement signal for generating a control signal when said rate of change falls below a predetermined value;
    means connected to said monitoring means for initiating an analysis of said measurement signal in response to said control signal;
    means connected to said initiating means for analyzing said measurement signal, including means for storing in response to said control signal only said more stationary value of the measurement signal;
    means for detecting said overshoot; and
    means connected to said detecting means and monitoring means for disabling said monitoring means until said overshoot has been detected.

14. In apparatus for analyzing a measurement signal of a transducer probe having an initial transient issuing into a more stationary value, the improvement comprising in combination:
    means for monitoring the rate of change of said measurement signal for generating a control signal when said rate of change falls below a predetermined value;

means connected to said monitoring means for initiating an analysis of said measurement signal in response to said control signal;

means connected to said initiating means for analyzing said measurement signal, including means for storing in response to said control signal only said more stationary value of the measurement signal;

means for imposing a delay on said measurement signal prior to its application to said monitoring means; and means for varying said delay as a function of said measurement signal.

15. In apparatus for analyzing at least two measurement signals generated by two transducer probes and having mutually overlapping initial transients issuing into more stationary values at different times, the improvement comprising in combination:

means for determining the time sequence wherein said measurement signal issue into said more stationary values;

means for analyzing each of said measurement signals; and means connected to said determining means and said analyzing means for sequentially applying said measurement signals to said analyzing means in response to said determined time sequence.

16. Apparatus as claimed in claim 15, including:

means in said analyzing means for changing a range of operation of said analyzing means as a function of said measurement signals.

17. Apparatus as claimed in claim 15, wherein:

said transducer probes include a first probe for measuring a temperature of a metallic melt, and a second probe for measuring an oxygen content of said melt; and said sequential applying means comprise means for connecting first said first probe and then said second probe to said analyzing means.

18. Apparatus as claimed in claim 17, including:

a third probe for measuring the temperature of a cooling melt; and means in said sequential applying means for connecting said third probe to said analyzing means after said second probe.

19. Apparatus as claimed in claim 17, including:

immersible means for jointly immersing said first and second probes into said metallic melt.

20. Apparatus as claimed in claim 15, including:

means connected to said analyzing means for varying parameters of the analysis of said measurement signals in said sequential application.

21. Apparatus as claimed in claim 15, wherein said analyzing means include:

first analyzing means for one of said measurement signals and second analyzing means for another of said measurement signals; and means common to said first and second analyzing means for selectively distributing said measurement signals to said first and second analyzing means.

22. Apparatus as claimed in claim 15, including:

means for determining for each measurement signal when the particular measurement signal has reached a predetermined value; and means connected to said sequential applying means for inhibiting a sequential application of said measurement signals until each measurement signal has reached its predetermined value.

23. Apparatus as claimed in claim 15, including:

means for monitoring the rate of change of at least a first of said measurement signals and for generating a control signal when said rate of change falls below a predetermined value; and means connected to said monitoring means and said analyzing means for enabling an analysis of said first measurement signal in response to said control signal.

24. Apparatus as claimed in claim 23, including:

means connected to said monitoring means and said sequential applying means for controlling the sequential application of said measurement signals to said analyzing means in response to said control signal.

25. Apparatus as claimed in claim 24, including:

means for monitoring the rate of change of a first of said measurement signals and for generating a first control signal when said rate of change falls below a predetermined value, and for monitoring the rate of change of a second of said measurement signals and for generating a second control signal when said rate of change of said second measurement signal falls below a predetermined value;

means connected to said monitoring means and said analyzing means for sequentially applying said first and second measurement signals to said monitoring means and said analyzing means in response to said first and second control signals.

26. In apparatus for analyzing a measurement signal of a transducer probe having an initial transient issuing into a more stationary value, the improvement comprising in combination:

means for monitoring the rate of change of said measurement signal for generating a control signal when said rate of change falls below a predetermined value;

means for effecting a comparison of an amplitude excursion of said initial transient with a stationary value of said measurement signal and for selectively enabling said monitoring means in response to said comparison;

means connected to said monitoring means for initiating an analysis of said measurement signal in response to said control signal; and means connected to said initiating means for analyzing said measurement signal.

27. In apparatus for analyzing a measurement signal of a transducer probe having an initial transient issuing into a more stationary value and having an overshoot in said initial transient, the improvement comprising in combination:

means for monitoring the rate of change of said measurement signal for generating a control signal when said rate of change falls below a predetermined value;

means for detecting said overshoot;

means connected to said detecting means and monitoring means for disabling said monitoring means until said overshoot has been detected;

means connected to said monitoring means for initiating an analysis of said measurement signal in response to said control signal; and means connected to said initiating means for analyzing said measurement signal.

28. In apparatus for analyzing a measurement signal of a transducer probe having an initial transient issuing into a more stationary value, the improvement comprising in combination:
- means for imposing a delay on said measurement signal;
- means for varying said delay as a function of said measurement signal;
- means for monitoring the rate of change of said varying delay measurement signal for generating a control signal when said rate of change falls below a predetermined value;
- means connected to said monitoring means for initiating an analysis of said measurement signal in response to said control signal; and
- means connected to said initiating means for analyzing said measurement signal.